US008600126B2

(12) United States Patent
Morita

(10) Patent No.: US 8,600,126 B2
(45) Date of Patent: Dec. 3, 2013

(54) IMAGE PROCESSING APPARATUS AND IMAGE PROCESSING METHOD, AND RECORDING MEDIUM FOR PROCESSING BREAST IMAGE BASED ON LOCAL CONTRAST VALUES IN A LOCAL REGION IN A MAMMARY GLAND REGION OF BREAST IMAGE

(75) Inventor: Junya Morita, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 406 days.

(21) Appl. No.: 12/385,303

(22) Filed: Apr. 3, 2009

(65) Prior Publication Data

US 2009/0252396 A1 Oct. 8, 2009

(30) Foreign Application Priority Data

Apr. 4, 2008 (JP) ................................. 2008-097888

(51) Int. Cl.
*G06K 9/00* (2006.01)
(52) U.S. Cl.
USPC .......................................................... 382/128
(58) Field of Classification Search
USPC ............. 382/128, 130–132, 174; 378/37, 62, 378/98.7
See application file for complete search history.

(56) References Cited

U.S. PATENT DOCUMENTS

| 5,761,334 A * | 6/1998 | Nakajima et al. ............. 382/132 |
| 2006/0055978 A1* | 3/2006 | Sato ............................. 358/3.01 |
| 2007/0189609 A1* | 8/2007 | Ito et al. ........................ 382/224 |

FOREIGN PATENT DOCUMENTS

| JP | 2001-238868 A | 9/2001 |
| JP | 2002-008009 | 1/2002 |
| JP | 2002-125961 | 5/2002 |
| JP | 2006-122445 | 5/2006 |
| JP | 2006-263055 | 10/2006 |
| JP | 2006-325638 A | 12/2006 |

* cited by examiner

*Primary Examiner* — Thanh Luu
*Assistant Examiner* — Renee Naphas
(74) *Attorney, Agent, or Firm* — Jean C. Edwards; Edwards Neils PLLC

(57) ABSTRACT

An image processing apparatus includes: an image obtaining device which obtains a breast image obtained by radiography of a breast; a mammary gland region extracting device which extracts a mammary gland region from the breast image; a local region setting device which sets a plurality of local regions around pixels belonging to the extracted mammary gland region; a local contrast value calculating device which calculates a plurality of local contrast values in a local regions, for each of the set plurality of local regions; and an image processing device which applies image processing to the breast image on the basis of the calculated plurality of local contrast values. Thus, considering a contrast between a mammary gland and a fat region, a stable image processing result can be obtained while enhancing viewability of a local mammary gland structure and a lesion.

13 Claims, 11 Drawing Sheets

IMAGE PROCESSING APPARATUS AND IMAGE PROCESSING METHOD, AND RECORDING MEDIUM FOR PROCESSING BREAST IMAGE BASED ON LOCAL CONTRAST VALUES IN A LOCAL REGION IN A MAMMARY GLAND REGION OF BREAST IMAGE

CROSS-REFERENCE TO RELATED APPLICATION

This application claims priority under 35 USC 119 from Japanese Patent Application 2008-097888, filed Apr. 4, 2008, the disclosure of which is incorporated herein by reference.

BACKGROUND OF THE INVENTION

1. Field of the Invention

The present invention relates to an image processing apparatus and an image processing method and particularly to a technology for obtaining a stable image processing result for a breast image with a large personal difference in mammography for breast diagnosis using an image of a breast photographed by X-ray.

2. Description of the Related Art

As a diagnosis using a medical image obtained by photographing a subject, mammography (breast X-ray photography) is conventionally known, for example. Breasts are different in size or mammary gland quantity among people and are said to be an organ with the largest personal difference in human tissues.

Thus, features of the breast images taken by the mammography have large personal differences, and density/contrast of the image becomes largely different depending on a ratio between mammary gland tissues and fat tissues, distribution state of the mammary gland tissues and the like. For example, an image of a breast with a large mammary gland amount often seen in a young generation can easily become a blurred image with a low contrast as compared with a breast with a small mammary gland amount.

In a breast, the mammary gland tissues and the fat tissues are present in a mixed state, and breast images can be classified into the following four mammary gland types according to the ratio and the distribution state of the mammary gland tissues. That is, they are four types of (1) a fatty type in which a breast region is substantially completely replaced by fat; (2) a mammary gland scattered type in which a mammary parenchyma is scattered in the breast region replaced by fat; (3) an uneven and high-density type in which the fat is mixed in the mammary parenchyma and presenting uneven density; and (4) a high-density type in which little fat is mixed in the mammary parenchyma.

FIGS. 8A and 8B show examples of signal value distribution in the mammary gland region. FIG. 8A is an example of the high-density type, and in the case of this high-density type breast, a density of the mammary gland tissues is high and an image signal value becomes the same degree, and thus, a sufficient contrast cannot be obtained, and discovery of a lesion portion is difficult. On the contrary, FIG. 8B is an example of the mammary gland scattered type, and in the case of this mammary gland scattered type breast, a high-density fat region is mixed in the mammary gland region, which causes a variation in the density of the mammary gland tissue and enhances the contrast of the mammary gland region, and thus, discovery of the lesion portion is relatively easy.

Also, FIGS. 9A and 9B show histogram shapes of the signal values corresponding to FIGS. 8A and 8B, respectively. As shown in FIG. 9A, if the mammary gland amount is large, the distribution of the signal values becomes narrow, while in the case of FIG. 9B, there is also a variation in the image signal values.

Then, application of preferable image processing according to image features of each has been carried out by image processing, giving consideration to the variation in the signal values in such a mammary gland region and analyzing the breast image in detail.

For example, such a method is known that the mammary gland amount is determined on the basis of a difference in the shape of the cumulative histogram and a preferable image processing condition is set according to the mammary gland amount (See Japanese Patent Application Laid-Open No. 2002-8009, for example).

Also, such a method is known that a mammary gland region is extracted based on the density of a pectoral muscle and the image processing condition is changed according to the mammary gland amount in the breast (See Japanese Patent Application Laid-Open No. 2002-125961, for example).

However, even if the mammary gland amount or the cumulative histogram shape is similar, the image processing condition suitable for each might be different depending on a difference in the contrast in the mammary gland.

Thus, as an image processing method using not only the mammary gland amount but also information relating to the signal value such as the contrast in the mammary gland is proposed. Specifically, the method is proposed, in which a contrast in the mammary gland is calculated by taking a difference between an average signal value of a high-density side 10% in a mammary gland structure and an average signal value of a low-density side 10% in the mammary gland structure, and the image processing condition is determined on the basis of the contrast in the mammary gland and the mammary gland amount (area ratio of the mammary gland region) (See Japanese Patent Application Laid-Open No. 2006-122445, for example).

Further, a method is known in which variance of the image signal values in the mammary gland region is calculated as the contrast in the mammary gland, and the high-density type and the others are classified by plotting the variance of the image signal values and a ratio of the mammary gland region to the breast region on a vertical axis and a horizontal axis (See Japanese Patent Application Laid-Open No. 2006-263055, for example).

SUMMARY OF THE INVENTION

However, with the above conventional arts, a global contrast is calculated on the basis of the signal values of the extracted mammary gland region as a whole, and there is a problem that viewability of (easiness to see) a local mammary gland structure and a lesion is not sufficiently considered. Considering the thickness of the mammary gland and the size of the lesion, a contrast in a local region of the unit of several mm is important to discriminate overlap of the mammary glands or a lesion.

Further, with the above conventional arts, since the extraction result of the mammary gland region affects the histogram shape of the signal values and changes the calculated contrast, accurate extraction of the mammary gland region is required. However, a border between the mammary gland and the other tissue regions might be inaccurate in actuality, and there is a problem that the accurate extraction of the mammary gland region is extremely difficult.

Moreover, with the above conventional arts, since the contrast is calculated on the basis of the signal values only of the mammary gland region, the contrast with a peripheral region (fat region) is not sufficiently considered. Thus, a contrast value different from an impression when the image is seen by eyes can be calculated in some cases.

For example, FIGS. 10A and 10B show original images of two types of breast images, while FIGS. 11A and 11B show results of region division thereof. Moreover, FIGS. 12A and 12B show histograms of the respective mammary gland regions.

The image shown in FIG. 10A looks as if the contrast of the mammary gland structure is extremely higher than the image of FIG. 10B, but looking at the histogram shown in FIG. 12A, spread of the signal values in the mammary gland region is not so large as compared with the histogram in FIG. 12B, and it can be determined that the contrast is low.

As mentioned above, since the contrast has been calculated on the basis of the signal values only of the mammary gland region, there is a fear that the contrast is erroneously determined as low even for an image with a high contrast when an original image thereof is seen.

The present invention was made in view of the above circumstances and has an object to provide an image processing apparatus and an image processing method that can obtain a stable image processing result considering a contrast between a mammary gland and a fat region for a breast image with a large personal difference and can execute image processing considering viewability (easiness to see) of a local mammary gland structure and a lesion.

In order to achieve the above object, a first aspect of the present invention provides an image processing apparatus comprising: an image obtaining device which obtains a breast image obtained by radiography of a breast; a mammary gland region extracting device which extracts a mammary gland region from the breast image; an local region setting device which sets a plurality of local regions around pixels belonging to the mammary gland region extracted by the mammary gland region extracting device; a local contrast value calculating device which calculates a plurality of local contrast values in the local regions, for each of the plurality of local regions set by the local region setting device; and an image processing device which applies image processing to the breast image on the basis of the plurality of local contrast values calculated by the local contrast value calculating device.

As a result, the viewability of the local mammary gland structure or lesion can be considered, and image processing considering the contrast between the mammary gland and the fat region can be executed.

In addition, according to a second aspect of the present invention, the local contrast value calculating device can calculate variance of signal values in the local regions in order to calculate the plurality of local contrast values in the local regions.

As a result, when the variance values of the plurality of local regions are integrated, a contrast value in the mammary gland can be stably calculated without being affected by a failure or a variation of the mammary gland region extraction or bias of mammary gland in the mammary gland region.

Further, according to a third aspect of the present invention, image processing executed by the image processing device can include at least one of gradation conversion processing and frequency enhancement processing.

As a result, the image processing considering the contrast between the mammary gland and the fat region can be realized.

Further, according to a fourth aspect of the present invention, the image processing device can apply gradation conversion processing to the breast image on the basis of the plurality of local contrast values calculated by the local contrast value calculating device and if the local contrast value is low, an inclination to a reference gradation conversion curve is increased so as to enhance the contrast and dynamic range compression processing on a high density side is enhanced.

As a result, the contrast can be increased, and image processing in which a crushed-black area is prevented can be executed.

Further, according to a fifth aspect of the present invention, the image processing device can adjust a gradation shift amount so that a density of the mammary gland region falls within a predetermined density range according to an output medium of the breast image after image processing.

As a result, the image processing can be carried out so that a density value of each region becomes appropriate.

Further, according to a sixth aspect of the present invention, the predetermined density range can be a range from 1.2 to 1.59 if the output medium is a film.

As a result, an image can be outputted to a film with an appropriate density.

In addition, in order to achieve the above object, a seventh aspect of the present invention provides an image processing method comprising the steps of: obtaining a breast image obtained by radiography of a breast; extracting a mammary gland region from the breast image; setting a plurality of local regions around pixels belonging to the extracted mammary gland region; calculating a plurality of local contrast values in the local regions, for each of the set plurality of local regions; and applying image processing to the breast image on the basis of the calculated plurality of local contrast values.

As a result, viewability (easiness to see) of the local mammary gland structure or lesion can be considered, and image processing considering the contrast between the mammary gland and the fat region can be executed.

Further, according to an eighth aspect of the present invention, the step of calculating the local contrast values includes a step of calculating variance of signal values in the local regions in order to calculate the plurality of local contrast values in the local regions.

As a result, when the variance values of the plurality of local regions are integrated, a contrast value in the mammary gland can be stably calculated without being affected by a failure or a variation of the mammary gland region extraction or bias of mammary gland in the mammary gland region.

Further, according to a ninth aspect of the present invention, the step of applying image processing includes a step of applying gradation conversion processing to the breast image on the basis of the calculated plurality of local contrast values, in which if the local contrast value is low, an inclination to a reference gradation conversion curve is increased so as to enhance the contrast and dynamic range compression processing on a high density side is enhanced.

As a result, the contrast can be increased, and image processing in which a crushed-black area is prevented can be executed.

Further, according to a tenth aspect of the present invention, a recording medium on which a program is recorded, the program comprising computer-executable instructions for causing a computer to execute steps of the image processing method according to any one of the aspects, is provided. This can also achieve the above purpose by installing the program to a computer from the recording medium, and then causing the computer to execute the program.

As mentioned above, according to any one of the aspects of the present invention, viewability (the easiness to see) of the local mammary structure or lesion can be considered, and image processing considering the contrast between the mammary gland and the fat region can be executed. In addition, if the variances of the signal values in the local regions are calculated in order to calculate the contrast value in the local regions, by integrating the variance values of the plurality of the local regions, the contrast value in the mammary gland can be stably calculated without being affected by a failure or a variation of the mammary gland region extraction or bias of mammary gland in the mammary gland region.

BRIEF DESCRIPTION OF THE DRAWINGS

FIGS. 8A and 8B are explanatory diagrams illustrating examples of breast images, in which FIG. 8A shows a high-density type, and FIG. 8B shows a mammary gland scattered type;

FIGS. 10A and 10B are explanatory diagrams illustrating examples of the breast images, in which FIG. 10A shows an example of a high contrast, and FIG. 10B shows an example of a low contrast;

DETAILED DESCRIPTION OF THE PREFERRED EMBODIMENTS

The image processing apparatus and the image processing method according to the present invention will be described below in detail referring to the attached drawings.

Figure 1:
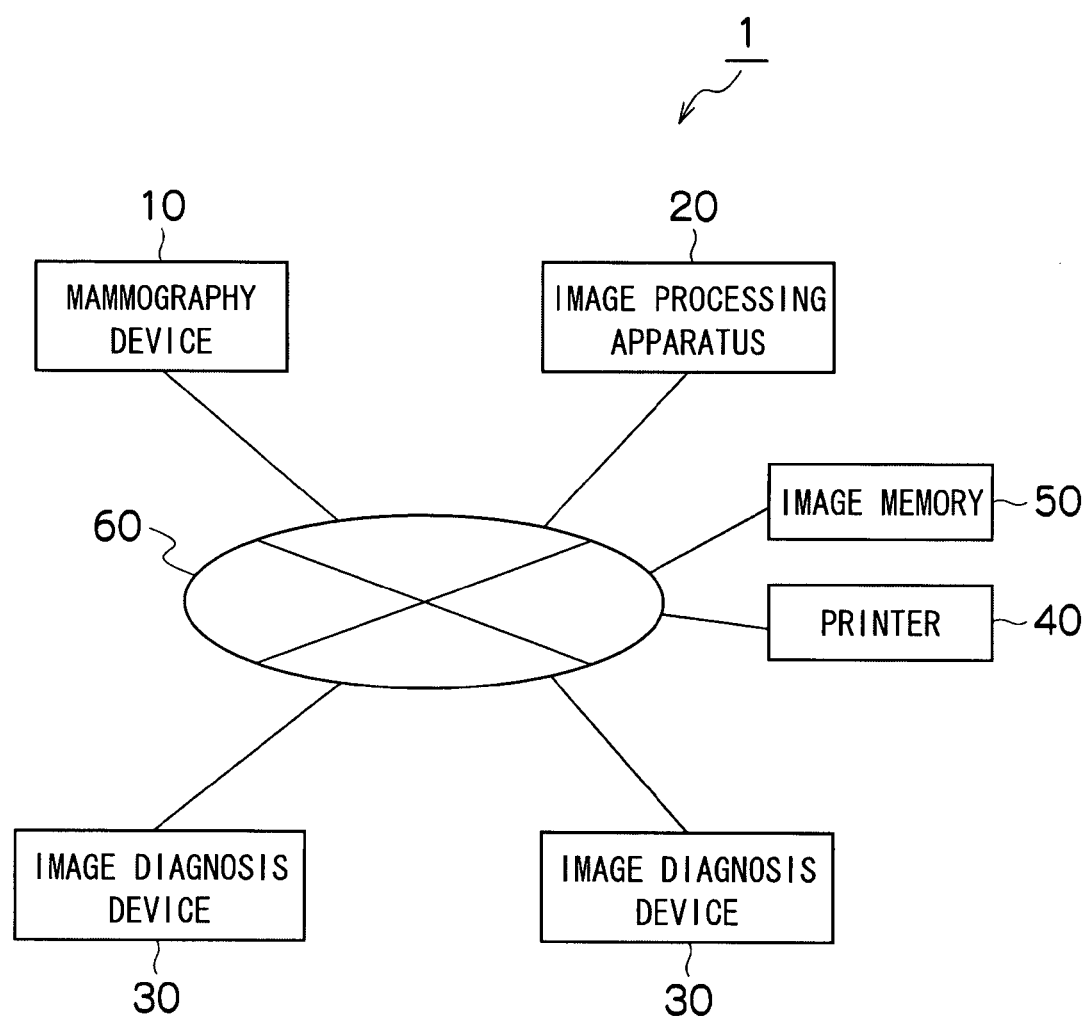
FIG. 1 is diagram showing an entire configuration of an image diagnosis system to which an image diagnosis device of the present invention is applied.

FIG. 1 is a diagram showing an entire configuration of an image diagnosis system to which an image processing apparatus of the present invention is applied.

As shown in FIG. 1, an image diagnosis system 1 comprises a mammography device 10 which picks up an image of a breast of a subject, an image processing apparatus 20 which applies image processing to a breast image (image data) photographed by the mammography device 10, an image diagnosis device 30 which displays an image to which image processing is applied by the image processing apparatus 20 for diagnosis, a printer (image output device) 40 which outputs the breast image photographed by the mammography device 10 or the image processed by the image processing apparatus 20 to a film and the like, and an image memory 50, which is a server in which image data including diagnosis results are accumulated, and they are connected to each other by a network 60.

Figure 2:
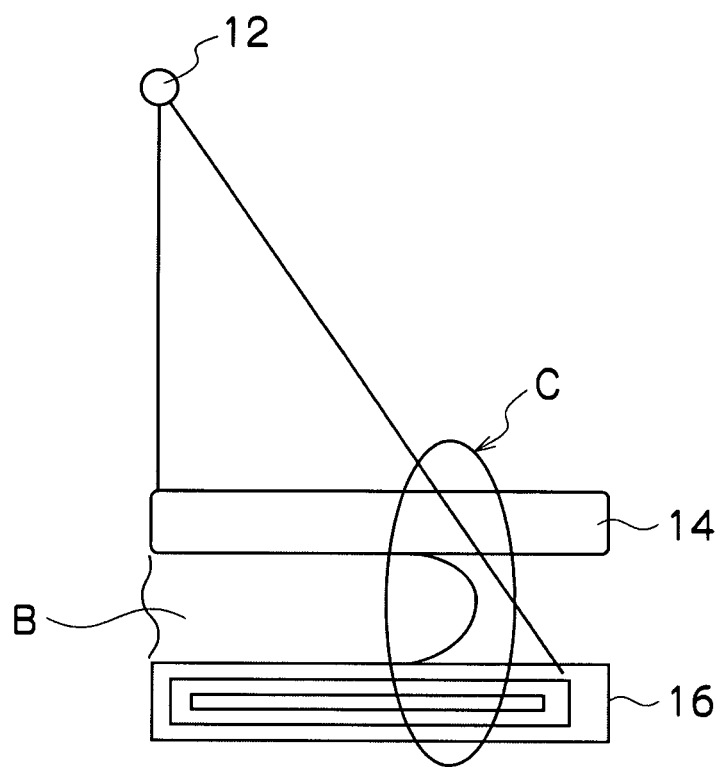
FIG. 2 is an explanatory diagram illustrating a state of a breast image photographing by a mammography device.

Description on a detailed configuration of the mammography device 10 will be omitted, but a state of simple breast image photographing is shown in FIG. 2.

As shown in FIG. 2, the mammography device 10 has an X-ray source 12, a pressure plate 14, and an X-ray detector 16. A breast B is sandwiched between the pressure plate 14 and the X-ray detector 16, an X-ray is irradiated from the X-ray source 12, and the X-ray transmitted through the breast B is detected by the X-ray detector 16.

The X-ray detector 16 is not particularly limited but it may be an imaging plate (cumulative fluorescent body sheet) IP made of a cumulative fluorescent body or a flat-panel type X-ray detector (flat panel detector) FPD in which an extremely large number of X-ray detecting elements using a semiconductor and the like are two-dimensionally arrayed on an X-ray detection surface, for example.

Photographing methods of a mammo (breast B) include cranio-caudal (CC) photographing by irradiating the X-ray from above, medio-lateral (ML) photographing by irradiating the X-ray from the side, and medio-lateral-oblique (MLO) photographing by irradiating the X-ray from an oblique direction.

Figure 3:
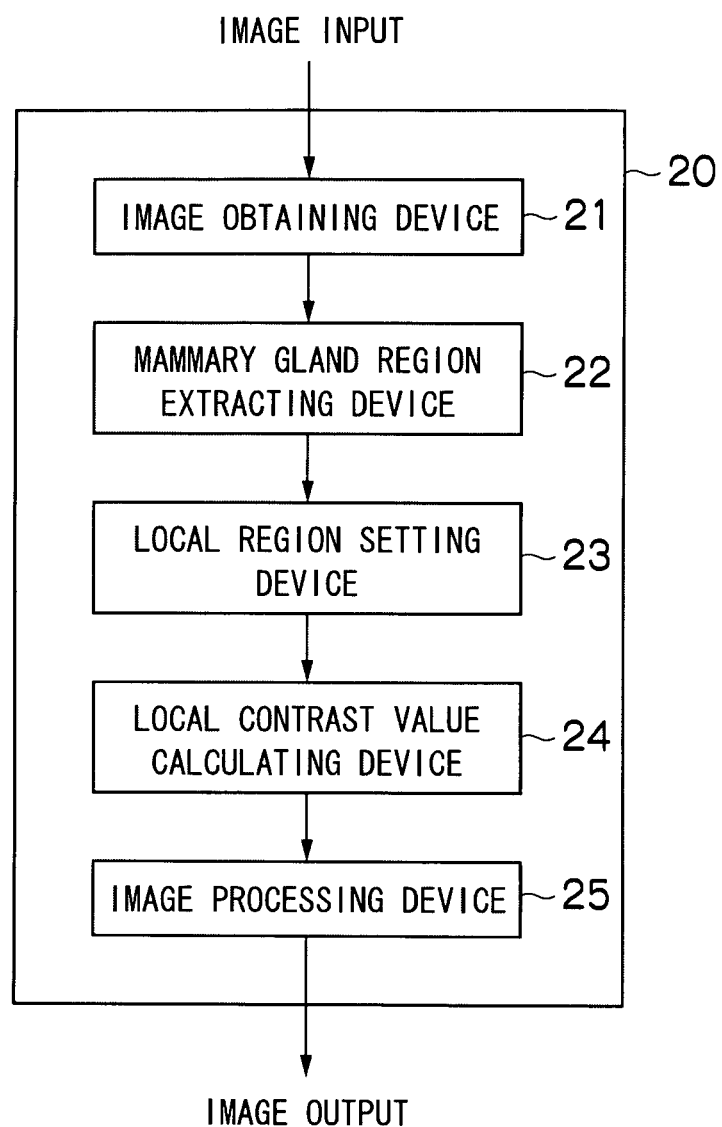
FIG. 3 is a diagram showing an outline configuration of an image processing apparatus.

FIG. 3 shows an outline configuration of the image processing apparatus 20.

As shown in FIG. 3, the image processing apparatus 20 of this embodiment is provided with an image obtaining device 21, a mammary gland region extracting device 22, a local region setting device 23, a local contrast value calculating device 24, and an image processing device 25.

The image obtaining device 21 obtains a breast image photographed by the mammography device 10 through the network 60.

The mammary gland region extracting device 22 divides the breast image obtained by the image obtaining device 21 into a plurality of tissue regions and extracts a mammary gland region.

The local region setting device 23 sets a plurality of local regions around pixels belonging to the mammary gland region extracted by the mammary gland region extracting device 22. Though the detail will be described later, approximately 500 pixels in the mammary gland region are selected, for example, and a square region of 5×5 mm around each of the pixels is set as each local region. However, the shape and size of the local region are not limited to that.

The local contrast value calculating device 24 calculates local contrast values of a mammary gland structure in the local regions. In this embodiment, in each local region, variances of signal values is calculated, and a median value of the plurality of variance values is calculated as a contrast value in the mammary gland. However, a calculating method of the contrast value in the local region is not limited to that.

The image processing device 25 executes image processing such as gradation conversion processing, frequency enhancement processing and the like on the basis of the calculated contrast value in the mammary gland so as to obtain an image easy to see (with a good viewability of) a local mammary gland structure or lesion.

Image data after processing is accumulated in the image memory 50 through the network 60 and also sent to the image diagnosis device 30 and offered for image diagnosis by a doctor or outputted to a film and the like from the printer 40 as necessary.

As an action of this embodiment, the image processing method executed at the image processing apparatus 20 will be described below.

Figure 4:
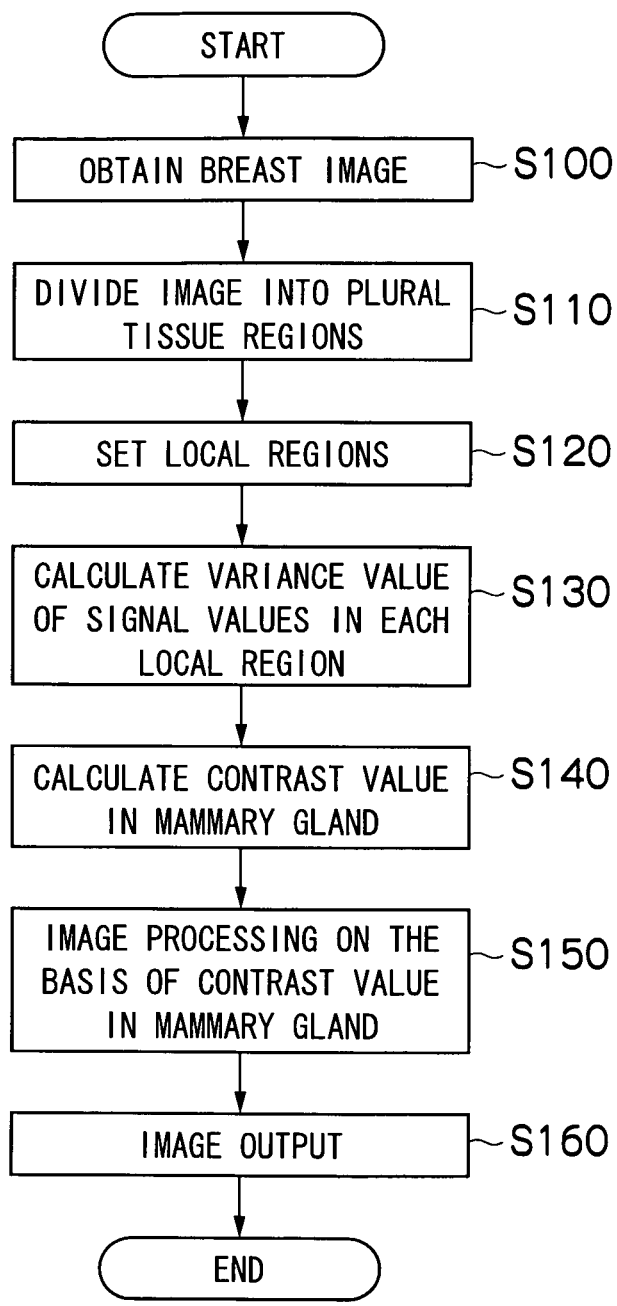
FIG. 4 is a flowchart illustrating a flow of processing of an image processing method of an embodiment.

FIG. 4 shows a flowchart of a flow of processing of the image processing method of this embodiment.

The present embodiment provides a stable calculating method of a mammary gland contrast favorably matching an impression when the image is seen at interpretation and an adaptive image processing method using the results. In that method, an inputted breast image is analyzed and a mammary gland region is extracted, a local contrast values of local regions around pixels in the mammary gland region are calculated for respective pixels, and image processing is carried out on the basis of a statistic amount of the plurality of local contrast values (median value, mode value, average value and the like). Description will be made below along the flowchart in FIG. 4.

First, at Step S100 in FIG. 4, the image obtaining device 21 receives a breast image photographed by the mammography device 10 through the network 60.

Then, at Step S110, the mammary gland region extracting device 22 divides the breast image obtained by the image obtaining device 21 into a plurality of tissue regions and extracts the mammary gland region. In extracting the mammary gland region, first, the image is divided into a plurality of tissue regions constituting the breast. Here, the "tissue region" means a region in which each tissue on the image is photographed. Since each tissue appears with specific density value, shape, and position on the image, division can be made into each tissue region according to information such as density value, shape, position and the like, but if a border with the other tissues is not clear, the division may be made into each tissue region according to an amount of tissues appearing in the region.

Figure 5A:
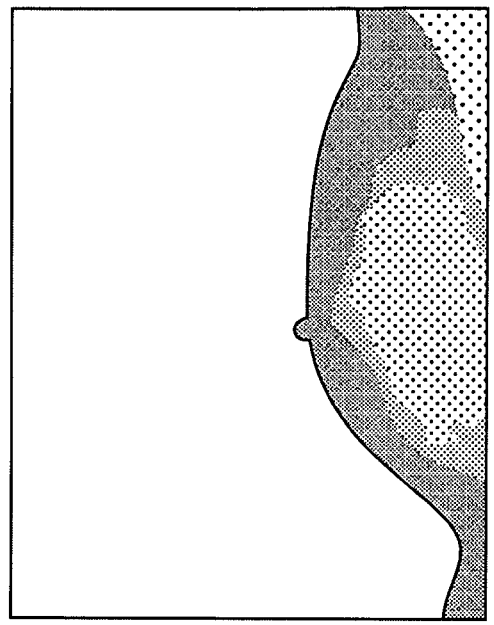
FIG. 5A is a diagram illustrating an example of a breast image and FIG. 5B is an explanatory diagram illustrating an example of image division.
Figure 5B:
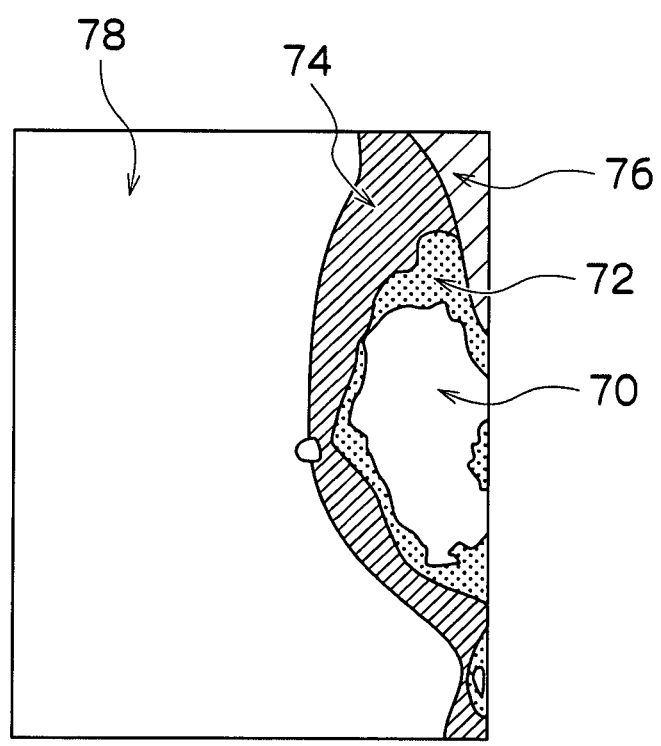

Here, the image is divided into five regions of a mammary gland region, a fat region, a fat region in near skin, a greater pectoral muscle region and an omission region. That is, the breast image as shown in FIG. 5A is divided into five regions of a mammary gland region 70, a fat region 72, a fat region 74 near skin, a greater pectoral region 76, and an omission region 78 as shown in FIG. 5B.

As shown in FIG. 2, since the breast B is photographed in pressure in general, the thickness becomes even, but as designated by reference character C in FIG. 2, there is a portion where the thickness becomes thin at the end of the breast. Since this region is expressed blacker than a region with an even thickness on the image, as shown in FIG. 5B, the fat region 74 near skin and the other fat regions 72 are separated even in the same fat tissue regions.

A method of dividing an image will be described below.

In dividing an image, first, the image is divided into a subject region and the omission region 78 which is a region outside the subject and to which the X-ray is directly irradiated. Since the omission region 78 presents particularly high density on the image, a peak appearing on the high density side in the density histogram of the entire image corresponds to the omission region 78. By applying binarization processing with a value obtained by subtracting a certain value from the peak value as a threshold value, the region is divided into the subject region and the omission region 78.

Subsequently, the subject region is further divided into two regions. That is, a threshold value is determined from the density histogram of the subject region by the discriminant analysis method and by applying the binarization processing with the threshold value, the region is divided into the fat region 74 near skin and the other regions.

Then, the greater pectoral region 76 is extracted. Since the border between the greater pectoral region 76 and the fat region 72 as well as the fat region 74 near skin has a relatively clear edge, scanning by differential operator is carried out, and a point having a large differential value is extracted as a border point of the greater pectoral region 76. A curve connecting the extracted border points is calculated, and a region (right end side in the figure) of the image on the side (body side portion) opposite the omission region 78 with regard to this curve is extracted as the greater pectoral region 76.

Lastly, a threshold value for extracting the mammary gland region 70 from density values of the greater pectoral region 76 and the fat region 72 in the vicinity of it is calculated, and the region is divided into the mammary gland region 70 and the fat region 72.

The threshold value calculating method is not particularly limited, but as described in Japanese Patent Application Laid-Open No. 2005-65855 according to the application by the applicant, for example, preferable method of calculating a threshold of density is exemplified. In that method, a region made up substantially of a pectoral muscle and fat in the side-face image of the breast is set as a sampling region, and on the basis of distribution of density in the sampling region thus set, a density $p1$ corresponding to the border between the pectoral muscle portion and the fat portion in the sampling region and an average density $p2$ of the pectoral muscle portion are acquired, and according to a predetermined calculation formula using the acquired $p1$ and $p2$, the threshold of density for separating the mammary gland region and the fat region in the side-face image is calculated.

Also, as post-processing of the image division, a micro isolated region in the extracted mammary gland region may be removed or the region may be contracted/expanded.

Figure 6:
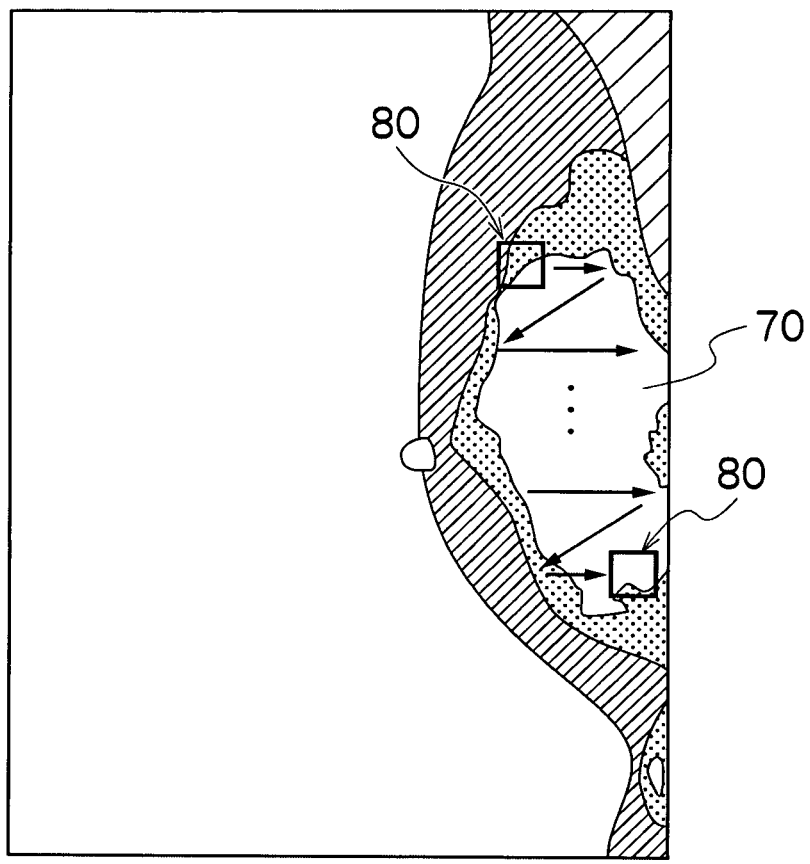
FIG. 6 is an explanatory diagram illustrating a state in which a local region is set for a mammary gland region.

Subsequently, at Step S120, the local region setting device 23 sets local regions around pixels belonging to the extracted mammary gland region 70. For example, as shown in FIG. 6, each local region 80 is set as a micro square region around a pixel belonging to the mammary gland region 70. In addition, as shown by an arrow in FIG. 6, the entire mammary gland region 70 is scanned. Since the thickness of the mammary gland is several mm, the size of each local region 80 is set so as to include both the mammary gland structure and the background. Empirically, the size of approximately 5×5 mm is preferable.

Also, when each local region 80 is set, it is not necessarily required that the inside of the mammary gland region 70 should be scanned sequentially as shown in FIG. 6. Pixels may be taken at random in the mammary gland region 70, the local regions 80 do not have to be neatly adjacent with each other, the local regions 80 may be separated from each other, or parts of the local regions 80 may be overlapped with each other.

When the local regions 80 are set, at the subsequent Step S130, in order to calculate local contrast values of the mammary gland structure in the local regions 80 by the local contrast value calculating device 24, variance of signal values is calculated in each local region 80.

It is not necessary to calculate variance values for all the pixels in the mammary gland region 70, but approximately 500 points are sufficient empirically.

Also, if the omission region 78, the fat region 74 near skin, and the greater pectoral region 76 are included in a local region 80, the variance value can be extremely large. Therefore, only the signal values of the mammary gland region 70 and the fat region 72 other than those near skin are used in the calculation of the variance values and the signal values of the other regions are excluded.

By calculating the variance value in each local region 80 as above, the viewability (easiness to see) of the local mammary gland structure and lesion can be considered. Also, by calculating not only the signal values only of the mammary gland region 70 but also the signal values of the fat region 72 other than those near skin, the contrast between the mammary gland and the peripheral region (fat region 72) can also be considered.

The variance of the signal values in each local region is calculated in order to calculate the local contrast value in each local region, but the method is not limited to that using the variance. For example, a difference between the maximum value and the minimum value or a difference in average signal values of each class when division is made into two classes by the discriminant analysis method may be acquired.

Then, at Step S140, a contrast value in the mammary gland is calculated. When the variance value is calculated in each local region 80, the contrast value in the mammary gland of the image is calculated by integrating them. Here, a median value of the plurality of variance values is calculated, and the value is made the contrast value in the mammary gland.

Since the variance values of the plurality of local regions 80 are integrated as above, the contrast value in the mammary gland can be stably calculated without being much affected by a partial failure in extracting the mammary gland region or a bias of the mammary gland in the mammary gland region and the like.

The median value of the plurality of variance values is calculated but a modal value or an adjusted average value which is an average obtained by cutting off upper and lower values, may be acquired.

Subsequently, at Step S150, image processing is carried out by the image processing device 25 on the basis of the calculated contrast value in the mammary gland.

Figure 7A:
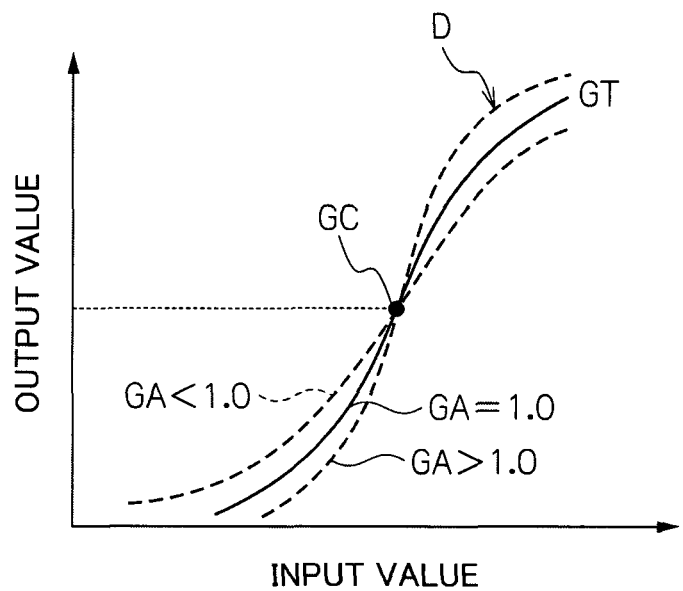
FIGS. 7A and 7B are diagrams illustrating examples of gradation conversion curves.
Figure 7B:
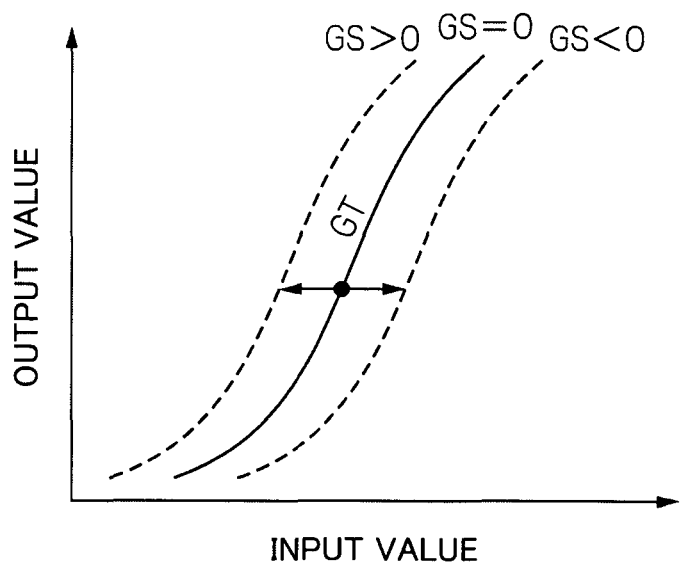
Figure 8A:
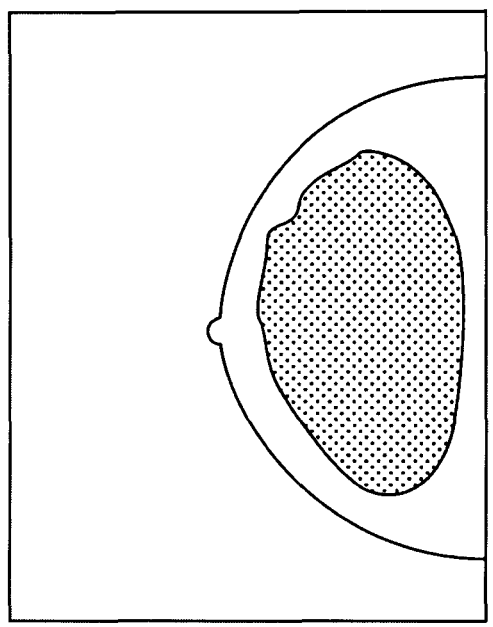
Figure 8B:
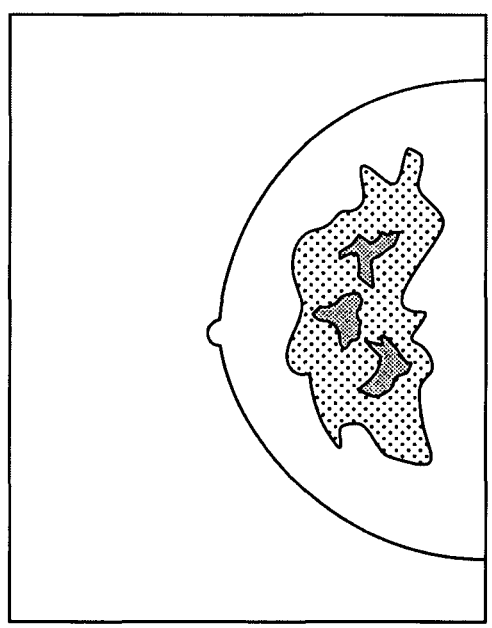
Figure 9A:
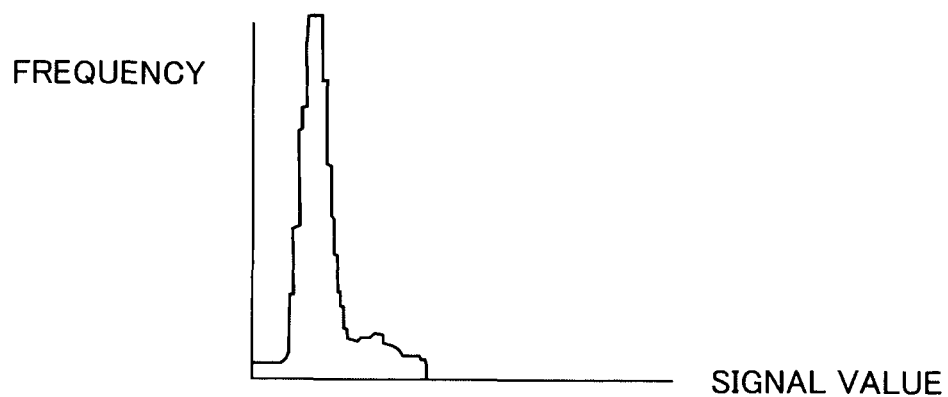
FIG. 9A is a histogram corresponding to FIG. 8A.
Figure 9B:
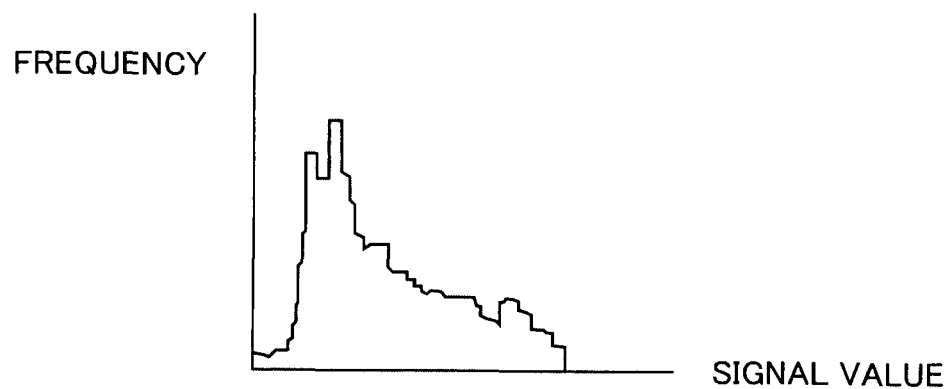
FIG. 9B is a histogram corresponding to FIG. 8B.
Figure 10A:
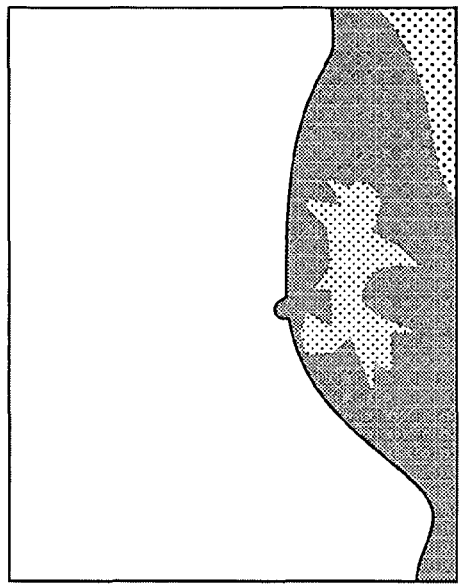
Figure 10B:
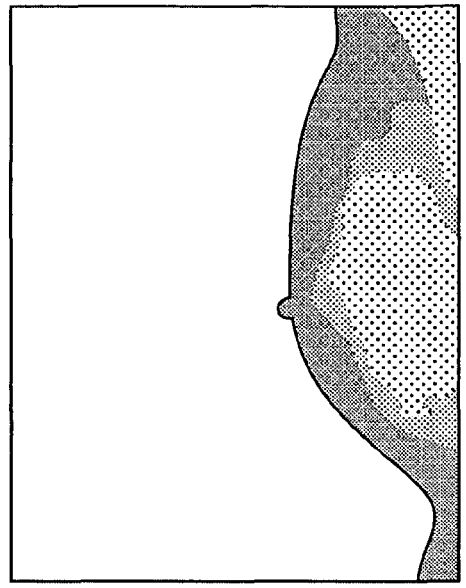
Figure 11A:
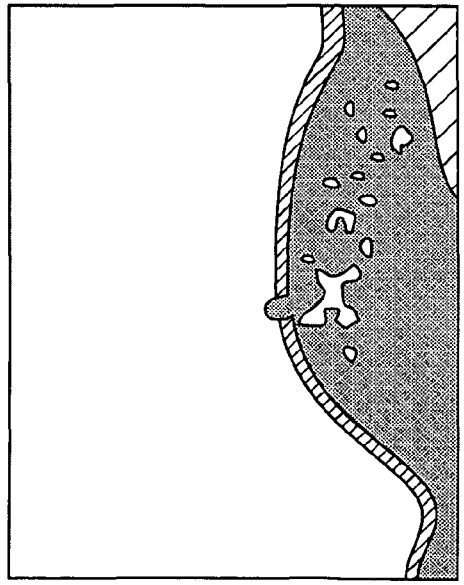
FIG. 11A is a diagram illustrating an example of image division corresponding to FIG. 10A.
Figure 11B:
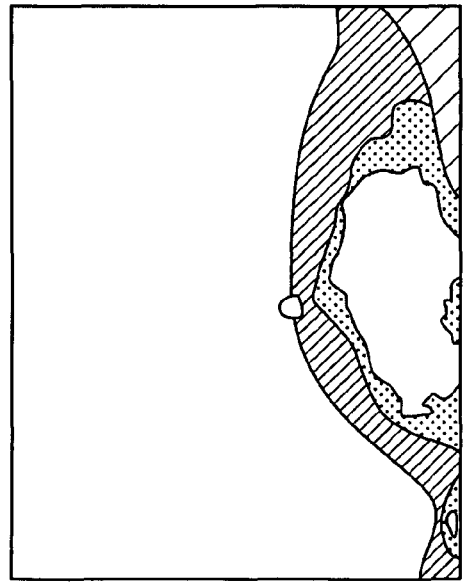
FIG. 11B is an explanatory diagram illustrating an example of image division corresponding to FIG. 10B.
Figure 12A:
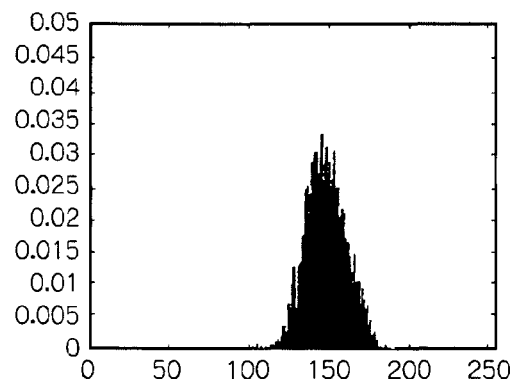
FIG. 12A is a histogram corresponding to FIG. 10A.
Figure 12B:
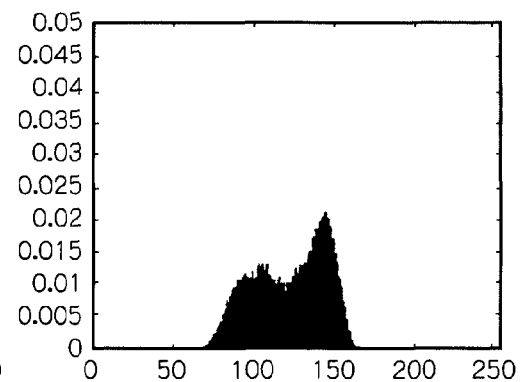
FIG. 12B is a histogram corresponding to FIG. 10B.

That is, gradation conversion processing is carried out on the basis of the calculated contrast value in the mammary gland. The gradation conversion curve is determined by four parameters of a gradation type GT, a rotation amount GA, a rotation center GC, and a gradation shift amount GS as shown in FIGS. 7A and 7B. If the contrast value in the mammary gland is low, as designated by a broken line D in FIG. 7A, the inclination GA is increased with respect to the reference gradation conversion curve so as to enhance the contrast.

Also, the more the gradation inclination is increased, the more easily the high-density region becomes a crushed-black area, and the dynamic range compression processing on the high-density side is adjusted to be increased or frequency enhancement processing in the high density region is adjusted to be increased at the same time in order to prevent occurrence of the crushed-black area.

Also, not only the contrast but also the density of the mammary gland region 70 is largely changed depending on the subject. By calculating an average density value of the mammary gland region 70 and the average density value of the fat region 72 and the like, the gradation conversion processing and the dynamic range compression processing are carried out so that the density value of each region becomes appropriate.

For example, if the breast image is outputted to a film, the density of the mammary gland region 70 is preferably within a range of 1.2 to 1.59, and as shown in FIG. 7B, the gradation shift amount GS is adjusted so that the density falls within the range. Also, the enhancement degree of the dynamic range compression processing is adjusted so that the density value of the fat region 72 becomes a target value.

The contrast of the low-density region (mammary gland region 70) is adjusted by the gradation conversion processing, while the contrast of the high-density region (fat region) is adjusted by the frequency enhancement processing. This is because, since lesion in the breast image has a wide frequency characteristics from a high frequency component (calcification) to a low frequency component (pale tumor), if a specific frequency component is enhanced in a low-density region where a possibility of presence of a lesion is high, even though a specific lesion becomes easy to be seen, the other lesions might become difficult to be seen.

If the gradation conversion curve and the like are changed for each image as above, processing configuration would be complicated. Therefore, it is more preferable that a plurality of patterns of image processing conditions are set in advance and an appropriate image processing condition is selected according to an analysis result of the image (contrast value in the mammary gland, mammary gland density, fat density and the like).

Further, the applicant has found that the configuration of the breast can be classified with accuracy by a ratio between the calculated contrast value in the mammary gland and an area of the mammary gland region (also called mammary gland ratio). The configuration of the breast is an evaluation relating to an amount and distribution of the mammary gland parenchyma of a breast and represents a degree of risk that a lesion is hidden by a normal mammary gland.

Though having been already described, the breast images are classified into the following four types of (1) to (4):

(1) Fatty type: A breast region is substantially completely replaced by fat, and in this case, detection is easy if the lesion is within the photographing range;

(2) Mammary gland scattered type: A mammary gland parenchyma is scattered in the breast region replaced by fat. In the case of this type, detection of the lesion is relatively easy;

(3) Uneven and high-density type: The fat is mixed in the mammary gland parenchyma and presenting uneven density. This type has a risk that a lesion is hidden by a normal mammary gland; and (4) High-density type: Little fat is mixed in the mammary parenchyma, and in this case, a lesion detection rate is low.

Here, as the result of examination by calculating the contrast value in the mammary gland and the mammary gland ratio for images of a plurality of cases, it was found out that though there is a correlation between the mammary gland ratio and the contrast value in the mammary gland, more accurate classification is possible by using two values rather than classification by only one of the values. The configuration of the breast is classified into the four types by linear discriminant analysis using the mammary gland ratio and the contrast value in the mammary gland as characteristic amounts.

Then, by setting temporary image processing conditions by a user for each of the four breast configurations, the temporary image processing conditions are automatically adjusted according to the contrast value in the mammary gland, mammary gland density, fat density and the like. In this way, it is extremely cumbersome for a user to set all the image processing conditions of the plural patterns, but since the four breast configurations are familiar to technicians and doctors, the image processing conditions can be examined relatively easily.

Accordingly, appropriate image processing results can be obtained by the automatic adjustment according to the analysis results while preferences of the users are reflected through the temporary image processing conditions.

When the image processing is finished, image data after processing is outputted from the image processing device 25.

The image data after processing is sent to the image diagnosis device 30 through the network 60 to be offered for diagnosis by a doctor and also sent to the image memory 50 and accumulated.

In photographing of breast images, right and left breasts are photographed in two directions (MLO, CC) in general in many cases. Thus, a set of plural images are inputted to the image processing apparatus in many cases. Since the images are arranged side by side and examined while being compared in image interpretation, it is preferable that the same image processing conditions are applied to the set of images. Inputted images are analyzed individually, and the contrast value in the mammary gland and the like are calculated for each image, and the image processing conditions are determined using an average value of the plural images.

However, the image processing conditions may be determined using only the analysis results of the MLO images with a larger information amount for reduction of processing time. Alternatively, it may be so configured that by comparing the analysis results of the right and left breasts, if there is a difference larger than a certain threshold value, the analysis results are considered as unreliable and a predetermined image processing condition is applied.

Alternatively, the same image processing conditions may be applied to the set of images, the image processing conditions may be determined individually, or a user may be able to select the conditions.

In addition, in comparison with the past images, it is preferable that the same image processing conditions as those for the past images are applied, but the image processing conditions may be determined individually or a user may be able to select the conditions.

As mentioned above, though the contrast in the mammary gland was calculated on the basis of the signal values of the entire mammary gland region in conventional arts, the contrast in the mammary gland is calculated on the basis of the signal value of the local region of the mammary gland in this embodiment, and thus, the viewability of the local mammary gland structure and a lesion can be considered.

In addition, though the contrast in the mammary gland was calculated only on the basis of the signal value in the mammary gland region in conventional arts, the local regions may include the fat region in this embodiment, and thus, the contrast between the mammary gland and the fat region can be considered.

Moreover, though the contrast in the mammary gland was calculated on the basis of the signal value of a single region (mammary gland region) in the conventional art, the variance values in the plurality of local regions are integrated in this embodiment, and thus, the result is hardly subjected to a failure or variation in the mammary gland region extraction or bias of the mammary gland in the mammary gland region.

The image processing apparatus and the image processing method according to embodiments of the present invention have been described in detail, but the present invention is not limited to the above examples. It is needless to say that various improvements and variations are possible in a range not departing from the gist of the present invention.

For example, a recording medium (for example, a ROM, flexible disk, optical disk, and so on) storing a program including computer-executable instructions for causing a computer to execute steps of the image processing method according to any one of the embodiments, can also achieve the aim of the present invention. In this case, first, the program is installed to a computer from the recording medium, and then the computer executes the program to perform the steps of the image processing method according to any one of the embodiments.

What is claimed is:

1. An image processing apparatus comprising:
    an image obtaining device which obtains a breast image obtained by radiography of a breast;
    a mammary gland region extracting device which extracts a mammary gland region from the breast image;
    a local region setting device which scans a plurality of pixels belonging to the mammary gland region extracted by the mammary gland region extracting device and which sets a plurality of local regions including mammary gland structure and background around each of the pixels;
    a local contrast value calculating device which calculates a plurality of local contrast values in the local regions, such that one local contrast value is calculated for each one of the plurality of local regions set by the local region setting device in order to calculate the contrast values of the mammary gland structure in the local regions; and
    an image processing device which applies image processing to the breast image on the basis of a contrast value in the mammary gland of the image by calculating a contrast value in the mammary gland region by integrating the plurality of local contrast values calculated in the mammary gland region.

2. The image processing apparatus according to claim 1, wherein the image processing device applies gradation conversion processing to the breast image on the basis of the plurality of local contrast values calculated by the local contrast value calculating device and on a condition that the local contrast value is low, an inclination to a reference gradation conversion curve is increased so as to enhance the contrast.

3. The image processing apparatus according to claim 1, wherein the image processing device adjusts a gradation shift amount so that a density of the mammary gland region falls within a predetermined density range according to an output medium of the breast image after image processing.

4. The image processing apparatus according to claim 1, wherein the local contrast value calculating device calculates variance of signal values in the local regions in order to calculate the plurality of local contrast values in the local regions.

5. The image processing apparatus according to claim 4, wherein image processing executed by the image processing device includes at least one of gradation conversion processing and frequency enhancement processing.

6. The image processing apparatus according to claim 4, wherein the image processing device applies gradation conversion processing to the breast image on the basis of the plurality of local contrast values calculated by the local contrast value calculating device and on a condition that the local contrast value is low, an inclination to a reference gradation conversion curve is increased so as to enhance the contrast.

7. The image processing apparatus according to claim 4, wherein the image processing device adjusts a gradation shift amount so that a density of the mammary gland region falls within a predetermined density range according to an output medium of the breast image after image processing.

8. The image processing apparatus according to claim 7, wherein the predetermined density range is a range from 1.2 to 1.59 if the output medium is a film.

9. An image processing method comprising the steps of:
    obtaining a breast image obtained by radiography of a breast;

extracting a mammary gland region from the breast image;
scanning a plurality of pixels belonging to the mammary gland region and setting a plurality of local regions including mammary gland structure and background around each of the pixels;
calculating a plurality of local contrast values in the local regions, such that one local contrast value is calculated for each one of the set plurality of local regions in order to calculate the contrast values of the mammary gland structure in the local region; and
applying image processing to the breast image on the basis of a contrast value in the mammary gland of the image by calculating a contrast value in the mammary gland region by integrating the plurality of local contrast values calculated in the mammary gland region.

10. The image processing method according to claim 9, wherein the step of applying image processing includes a step of applying gradation conversion processing to the breast image on the basis of the calculated plurality of local contrast values, in which on a condition that the local contrast value is low, an inclination to a reference gradation conversion curve is increased so as to enhance the contrast.

11. The image processing method according to claim 9, wherein the step of calculating the local contrast values includes a step of calculating variance of signal values in the local regions in order to calculate the plurality of local contrast values in the local regions.

12. The image processing method according to claim 11, wherein the step of applying image processing includes a step of applying gradation conversion processing to the breast image on the basis of the calculated plurality of local contrast values, in which if the local contrast value is low, an inclination to a reference gradation conversion curve is increased so as to enhance the contrast.

13. A recording medium on which a program is recorded, the program comprising computer-executable instructions of:
obtaining a breast image obtained by radiography of a breast;
extracting a mammary gland region from the breast image;
scanning a plurality of pixels belonging to the mammary gland region and setting a plurality of local regions including mammary gland structure and background around each of the pixels;
calculating a plurality of local contrast values in the local regions, such that one local contrast value is calculated for each one of the set plurality of local regions in order to calculate the contrast values of the mammary gland structure in the local regions; and
applying image processing to the breast image on the basis of a contrast value in the mammary gland of the image by calculating a contrast value in the mammary gland region by integrating the plurality of local contrast values calculated in the mammary gland region.

\* \* \* \* \*